(12) United States Patent
Bruch et al.

(10) Patent No.: US 12,254,683 B2
(45) Date of Patent: Mar. 18, 2025

(54) DETERMINING A SOURCE OF DANGER ON A ROADWAY

(71) Applicant: CARIAD SE, Wolfsburg (DE)

(72) Inventors: Anton Bruch, Berlin (DE); Fabian Diegmann, Ingolstadt (DE)

(73) Assignee: CARIAD SE, Wolfsburg (DE)

( * ) Notice: Subject to any disclaimer, the term of this patent is extended or adjusted under 35 U.S.C. 154(b) by 469 days.

(21) Appl. No.: 17/439,302

(22) PCT Filed: Feb. 6, 2020

(86) PCT No.: PCT/EP2020/052930
§ 371 (c)(1),
(2) Date: Sep. 14, 2021

(87) PCT Pub. No.: WO2020/187483
PCT Pub. Date: Sep. 24, 2020

(65) Prior Publication Data
US 2022/0157067 A1    May 19, 2022

(30) Foreign Application Priority Data
Mar. 15, 2019  (DE) .................... 10 2019 106 625.5

(51) Int. Cl.
*G06V 10/82*    (2022.01)
*G06V 10/764*   (2022.01)
*G06V 20/56*    (2022.01)
*G06V 20/58*    (2022.01)

(52) U.S. Cl.
CPC ............ *G06V 10/82* (2022.01); *G06V 10/764* (2022.01); *G06V 20/588* (2022.01); *G06V 20/58* (2022.01)

(58) Field of Classification Search
CPC ..... G06V 10/82; G06V 10/764; G06V 20/588

USPC .......................................................... 382/103
See application file for complete search history.

(56) References Cited

U.S. PATENT DOCUMENTS

| | | | | |
|---|---|---|---|---|
| 9,008,369 B2 * | 4/2015 | Schofield | ................. | H04N 7/18 382/104 |
| 9,191,634 B2 * | 11/2015 | Schofield | ............... | H04N 23/54 |
| 9,428,192 B2 * | 8/2016 | Schofield | .............. | B60W 50/14 |
| 10,668,924 B2 * | 6/2020 | Lee | ..................... | B60W 30/143 |

(Continued)

OTHER PUBLICATIONS

Andrews et al., "Transfer Representation-Learning for Anomaly Detection," *Proceedings of the 33$^{rd}$ International Conference on Machine Learning*, New York, NY, 2016, 5 pages.
Badrinarayanan et al., "SegNet: A Deep Convolutional Encoder-Decoder Architecture for Image Segmentation," arXiv: 1511.00561v3 [cs.CV], Oct. 10, 2016.

(Continued)

*Primary Examiner* — William D Titcomb
(74) *Attorney, Agent, or Firm* — Seed Intellectual Property Law Group LLP

(57) ABSTRACT

In a method for determining a source of danger on a roadway in a detection area in front of or behind a vehicle with the aid of a camera of the vehicle, an image of the detection area is captured with the aid of the camera, image data corresponding to the image are generated, a first image area of the image is determined with the aid of the image data using a neural network, which first image area corresponds to the roadway in the detection area, and a second image area of the image is determined with the aid of the first image area using the neural network, which second image area corresponds to the source of danger on the roadway in the detection area.

20 Claims, 7 Drawing Sheets

(56) References Cited

U.S. PATENT DOCUMENTS

| | | | |
|---|---|---|---|
| 10,984,257 B2* | 4/2021 | Englard | G06T 7/50 |
| 11,715,005 B2* | 8/2023 | Talmi | G06N 3/08 |
| | | | 713/171 |
| 2015/0371095 A1* | 12/2015 | Hartmann | G06T 7/11 |
| | | | 348/148 |
| 2017/0024877 A1 | 1/2017 | Versace et al. | |
| 2018/0198955 A1* | 7/2018 | Watanabe | G09G 3/001 |
| 2018/0210896 A1 | 7/2018 | Guo | |
| 2019/0176841 A1* | 6/2019 | Englard | G01S 7/4026 |
| 2019/0205667 A1* | 7/2019 | Avidan | G06F 18/28 |
| 2020/0020104 A1* | 1/2020 | Mittal | G06V 20/588 |
| 2020/0062245 A1* | 2/2020 | Samotsvet | G06T 7/60 |
| 2020/0114908 A1* | 4/2020 | Lim | G06V 20/588 |
| 2020/0160070 A1* | 5/2020 | Sholingar | G06T 7/70 |
| 2020/0175339 A1* | 6/2020 | Viswanathan | G06V 20/56 |
| 2020/0273201 A1* | 8/2020 | Mittal | G06V 10/454 |

OTHER PUBLICATIONS

Chalapathy et al., "Anomaly Detection using One-Class Neural Networks," arXiv: 1802.063601v1 [cs.LG], Feb. 18, 2018, 9 pages.

Creusot et al., "Real-time small obstacle detection on highways using compressive RBM road reconstruction," 2015 IEEE Intelligent Vehicles Symposium (IV), June 28-Jul. 1, 2015, COEX, Seoul, Korea, pp. 162-167. (6 pages).

Deepika N et al., "Obstacle Classification and Detection for Vision Based Navigation for Autonomous Driving," IEEE, 2017, pp. 2092-2097. (6 pages).

International Search Report, mailed May 27, 2020, for International Application No. PCT/EP2020/052930, 3 pages.

Park et al., "Patch-based crack detection in black box road images using deep learning," 35$^{th}$ International Symposium on Automation and Robotics in Construction (ISARC 2018), 4 pages.

* cited by examiner

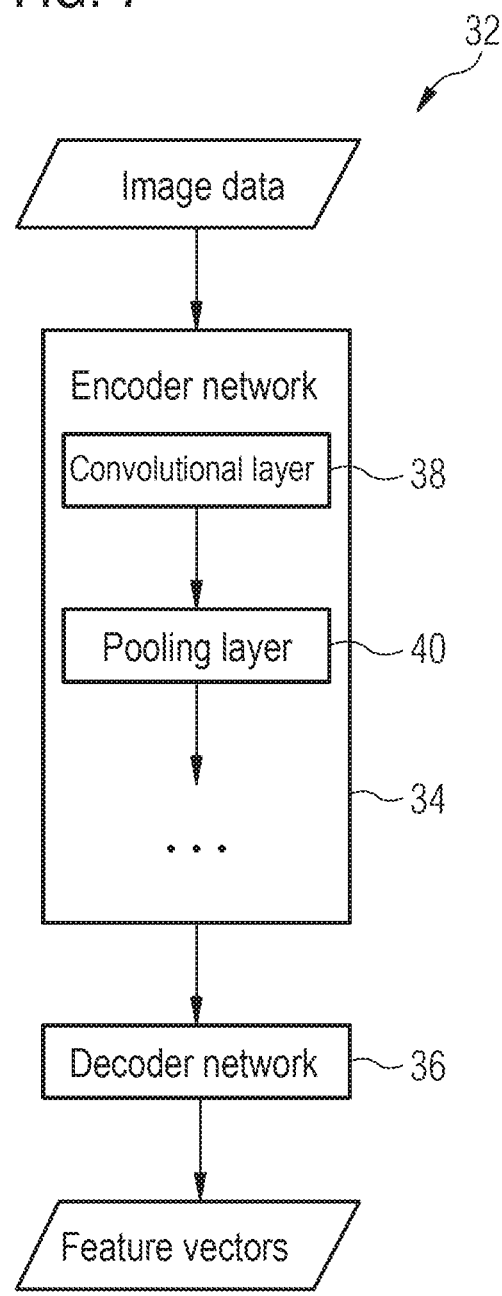

DETERMINING A SOURCE OF DANGER ON A ROADWAY

BACKGROUND

Whether driven by human drivers or autonomous driving systems, road vehicles such as cars encounter various sources of danger. One possible source of danger is objects—such as lost load or an exhaust pipe, or a person—on the roadway. Other sources of danger on the roadway include potholes, ice sheets, or water films that can cause aquaplaning.

BRIEF DESCRIPTION OF THE DRAWINGS

FIG. 7 shows a schematic representation of a neural network.

DETAILED DESCRIPTION

Figure 1:
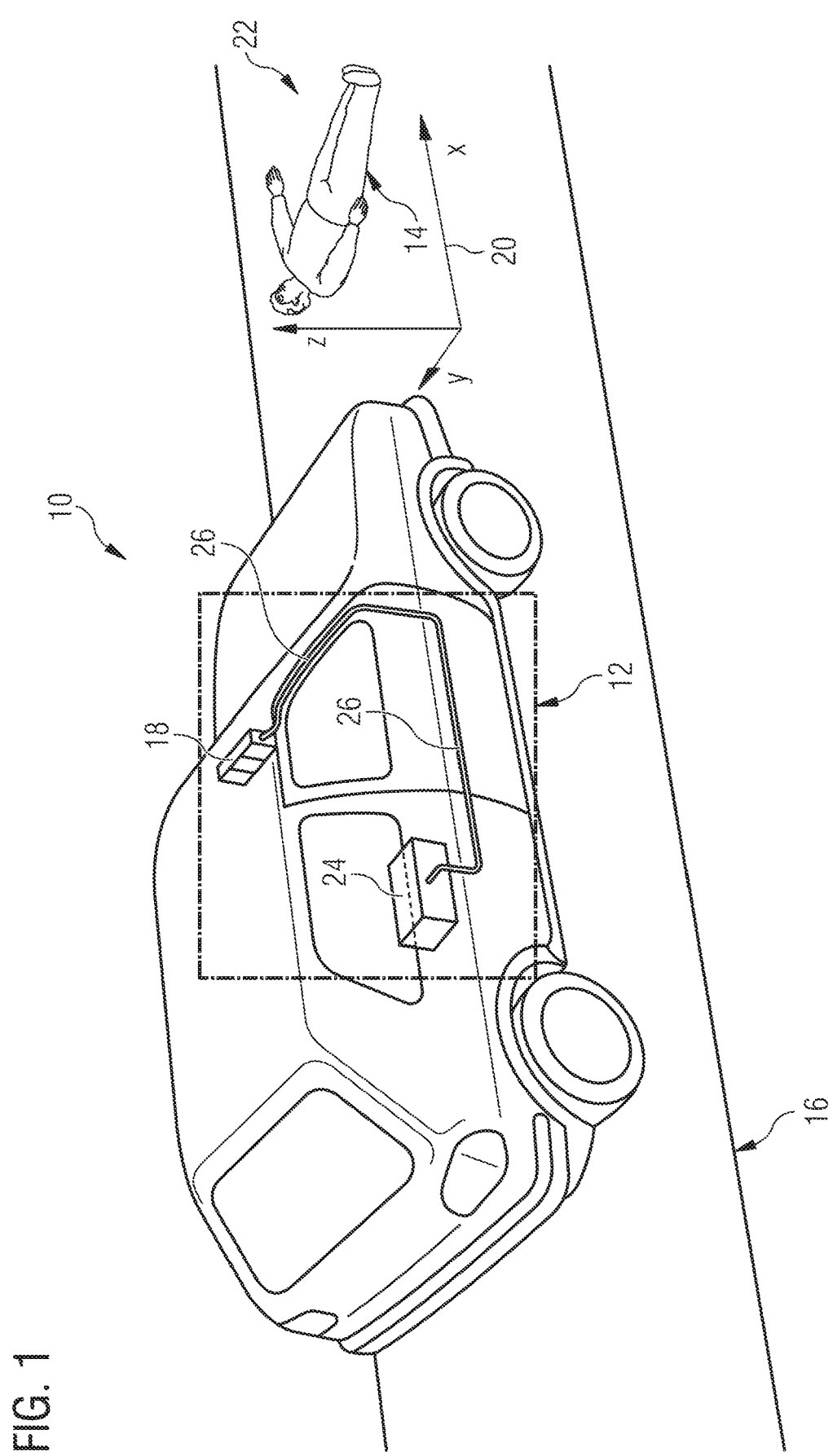
FIG. 1 shows a vehicle with a device for determining a source of danger on a roadway by means of a camera.

Previously known neural network-based methods, such as MonoDepth or Semantic Segmentation, cannot classify such sources of danger due to a lack of training data and thus cannot detect them. In typical traffic situations, these sources of danger occur too rarely to generate a suitable data set for training the neural networks.

Methods based on the optical flow of a sequence of images of the detection area are only applicable if the distance between the vehicle and the source of danger is too small. Furthermore, such methods are very computationally intensive.

From the document Andrews et al., Transfer Representation-Learning for Anomaly Detection, Proceedings of the 33rd International Conference on Machine Learning, two methods for detecting anomalies in a data set are known. Both methods use the output of an intermediate neural network layer to perform anomaly detection using a support vector machine. The neural network used in the first method was trained using a data set other than the one to be classified. The second method uses a neural network trained using a part of the dataset to be classified that does not contain anomalies.

From the document Badrinarayanan et al., SegNet: A Deep Convolutional Encoder-Decoder Architecture for Image Segmentation, arXiv:1511.00561v3, a method for semantic classification of pixels using a neural network is known. The neural network used comprises an encoder network, which performs a semantic segmentation of an image into different image areas, and a decoder network, which uses parameters of the encoder network to assign one of the image areas to individual pixels.

From the document Chalapathy et al., Anomaly Detection using One-Class Neural Networks, arXiv:1802.06360v1, a method for detecting anomalies in a complex data set is known. The neural network used comprises a fixed-weight encoder network that classifies the data set, and a feedforward network downstream of the encoder network that is specifically trained to detect anomalies in the classified data set.

The inventors have conceived and reduced to practice a software and/or hardware facility for determining a source of danger on a roadway in a detection area in front of or behind a vehicle is easily possible by means of a camera of the vehicle ("the facility").

In some embodiments, a camera is firmly connected to the vehicle. The roadway can in particular be a road. The vehicle is, in some embodiments, a road vehicle. The source of danger may be an object, such as a lost load or an exhaust pipe, or a person on the roadway. The source of danger can also be a pothole, a sheet of ice or a film of water that can cause aquaplaning.

To determine the source of danger on the roadway in the detection area, the facility first uses the first image area to restrict the search for the source of danger to a specific subarea of the detection area. The neural network thereby determines a representation of the image using the image data, in particular in the form of a matrix of feature vectors. This representation is used to classify image areas of the image. Using the representation, the first image area is determined. The first image area corresponds to the roadway in the detection area. Furthermore, the second image area of the image is determined, for example by means of an output information of an intermediate layer of the neural network in the first image area. This is done in particular using the same neural network that is used to determine the first area. The second image area corresponds to the source of danger in the detection area on the roadway. Alternatively, another neural network can be used to determine the second image area.

In some embodiments, only one single image of the detection area is required to detect the source of danger. In particular, this one image need not be a stereoscopic image. Thus, only a mono camera, i.e., a camera having one single lens and capable of capturing only non-stereoscopic images, is required to perform the method. In some embodiments, the invention is thus easy to carry out.

In some embodiments, the second image area is determined with the aid of the first image area using output information from an intermediate layer of the neural network. The intermediate layer is, in some embodiments, a layer of an encoder network of the neural network. The source of danger is an anomaly, i.e., an unexpected or atypical pattern, in the first image area, which comprises substantially only the roadway in the detection area. It is known from the document Andrews et al., Transfer Representation-Learning for Anomaly Detection, Proceedings of the 33rd International Conference on Machine Learning, that the output of an intermediate layer of a neural network can be used to detect anomalies in a data set. This property of neural networks is used in some embodiments to determine the first area and to detect the source of danger in the image data corresponding to the first image area by means of the same neural network. This makes the method particularly easy to perform, since only one single neural network is required.

In some embodiments, a first feature vector is determined for each pixel of the image by means of the image data using the neural network and the first image area is determined by means of these first feature vectors. The pixels of the image are classified using the first feature vectors. This classification is used to perform a semantic segmentation, i.e., a division of the image into content-related areas, of the image and thus to determine the first image area. In the present application, feature vector means both the output information of a neural network itself and the output information of an intermediate layer of the neural network.

In some embodiments, second feature vectors are determined using the neural network and the second image area is determined using these second feature vectors. In particular, an output information of an intermediate layer of the neural network is used to determine the second feature vectors. Alternatively or additionally, a second feature vector is determined for predetermined subareas of the first image area using the neural network. The pixels associated with the first image area are classified using the second feature vectors. This classification is used to determine the second image area and thus the source of danger.

In some embodiments, second feature vectors are determined using the neural network for the first image area. In particular, an output information of an intermediate layer of the neural network is used to determine the second feature vectors. A mean value of the second feature vectors assigned to the pixels of the first image area is determined. For each of the second feature vectors, the difference between this mean value and the respective second feature vector is formed. If the value of this difference is above, below or at a predetermined threshold value, a predetermined subarea of the image assigned to the respective second feature vector is assigned to the second image area. This difference is, in some embodiments, weighted. In particular, deviations from the mean value which are above, below or at a predetermined threshold value indicate an anomaly, i.e., here specifically the source of danger, and can be used to classify pixels of the first image area. By means of this classification, the second image area, which corresponds to the source of danger, can be determined.

In some embodiments, the second image area is determined with the aid of the first image area using an output information of an encoder network of the neural network. The encoder network determines a representation of the first image area, in particular in the form of a matrix of feature vectors. This representation is used to classify predetermined subareas of the image. The size of the predetermined subareas depends in particular on the ratio of the resolution of the image to the resolution of the representation. Using this representation, the second image area can thus be determined particularly easily. In some embodiments, only a part of the encoder network is used to determine the second image area, for example an intermediate layer of the encoder network.

In some embodiments, pixels of the image associated with the first area are determined by means of the image data using a decoder network of the neural network. In particular, the decoder network determines the pixels of the image associated with the first area using the representation determined by the encoder network. The decoder network increases the resolution of the representation determined by the encoder network again, so that pixels of the image can be assigned to the first image area.

In some embodiments, the neural network is a convolutional neural network. Convolutional neural networks (CNN) generally consist of multiple convolutional layers and pooling layers. The input to convolutional neural networks are usually image pixels arranged in matrices. These matrices are convolved in the convolutional layers with a convolution matrix or a filter kernel. In the pooling layers, the resolution of one of the outputs of the convolutional layers is reduced in order to reduce memory requirements and save computing time. Especially in image recognition, convolutional neural networks have a very low error rate.

In some embodiments, the neural network has been trained by means of images of real, in particular typical, traffic situations, which have been recorded by means of a camera of another vehicle or of the vehicle.

In some embodiments, an enveloping body surrounding the source of danger is determined by means of the image data. The position of the enveloping body is, in some embodiments, determined in three-dimensional coordinates, in particular in vehicle-fixed coordinates or in stationary coordinates. The enveloping body is in particular a cuboid surrounding the source of danger. The enveloping body can be used, for example, to drive around the source of danger or to initiate a braking procedure of the vehicle.

In some embodiments, the source of danger is classified by means of the image data using an image recognition method, in particular a further neural network. This makes it possible to distinguish between different sources of danger and thus to increase the accuracy of the method.

In particular, the facility can be used by an autonomously driving vehicle, which, for example, initiates an evasive maneuver, a braking procedure or an emergency braking procedure on the basis of the detected source of danger. Furthermore, the facility can be used by a driver assistance system that, for example, draws attention to the detected hazards or independently initiates a braking procedure based on the detected source of danger.

Further features and advantages result from the following description, which explains several embodiments in more detail in connection with the accompanying figures.

FIG. 1 shows a vehicle 10 with a device 12 for determining a source of danger 14 on a roadway 16 by means of a camera 18. In the embodiment shown, the vehicle 10 is designed as a passenger car.

FIG. 1 further shows a coordinate cross 20 of a stationary coordinate system. A first coordinate axis X runs parallel to the roadway 14 and in the direction of travel of the vehicle 10. A second coordinate axis Y also runs parallel to the roadway 14 and is perpendicular to the first coordinate axis X. The second coordinate axis Y is transverse to the direction of travel of the vehicle 10. A third coordinate axis Z points upward and is perpendicular to the plane spanned by the first coordinate axis X and the second coordinate axis Y.

The device 12 comprises the camera 18, which is firmly connected to the vehicle 10. The camera 18 is oriented in the direction of travel of the vehicle 10, or in the direction of the first coordinate axis X such that it can detect a detection area 22 on the roadway 16 in front of the vehicle 10. The device 12 further comprises an image processing and evaluation unit 24, which is connected to the camera 18 via a cable 26. Alternatively, the evaluation unit 24 may be located outside the vehicle 10, for example in an external server. The image processing and evaluation unit 24 is designed to use image data corresponding to an image of the detection area 22 recorded by the camera 18 to determine, using a neural network 32 (FIG. 7), a first image area of the image which corresponds to the roadway 16 in the detection area 22, to determine, using image data corresponding to the first image area and using the neural network 32, a second image area of the image which corresponds to the source of danger 14 on the roadway 16 in the detection area 22. The neural network 32 includes an encoder network 34 and a decoder network 36 and will be further described in connection with FIG. 7 below.

The operation of the facility is described further below with respect to a particular example. In particular, the detection area 22 is in front of the vehicle 10 in the example shown. It goes without saying that the example facility is correspondingly also applicable to an area behind the vehicle 10.

Figure 2:
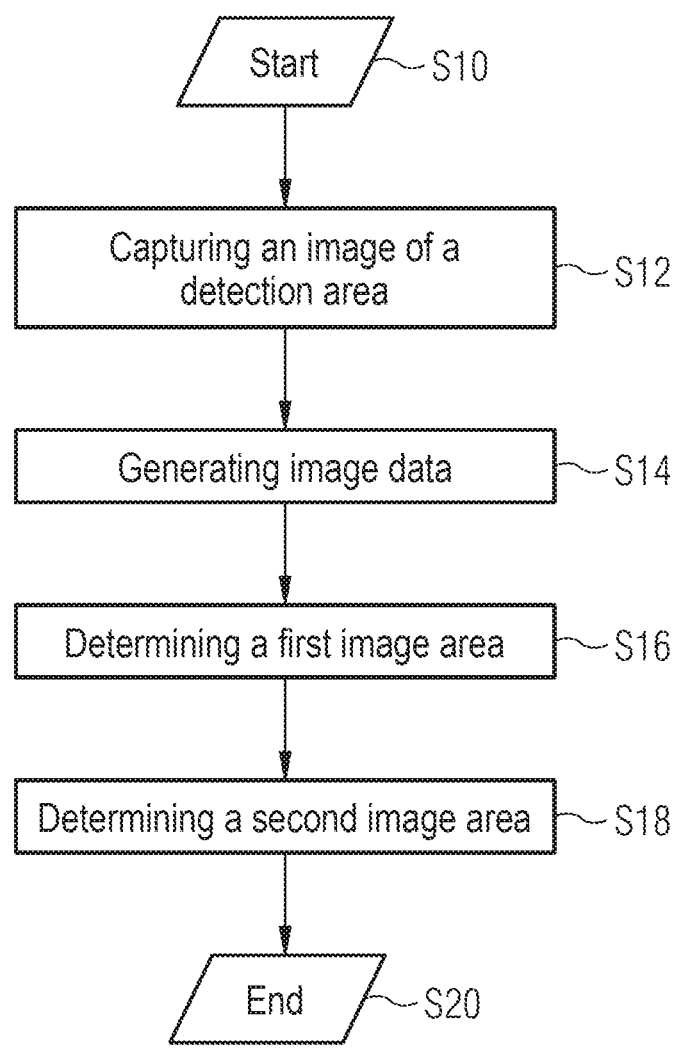
FIG. 2 shows a flowchart of a procedure for determining a source of danger on a roadway by means of a camera.

FIG. 2 shows a flowchart of a method for determining the source of danger 14 in the detection area 22 of the camera 18 on the roadway 16 according to an embodiment.

Figure 5:
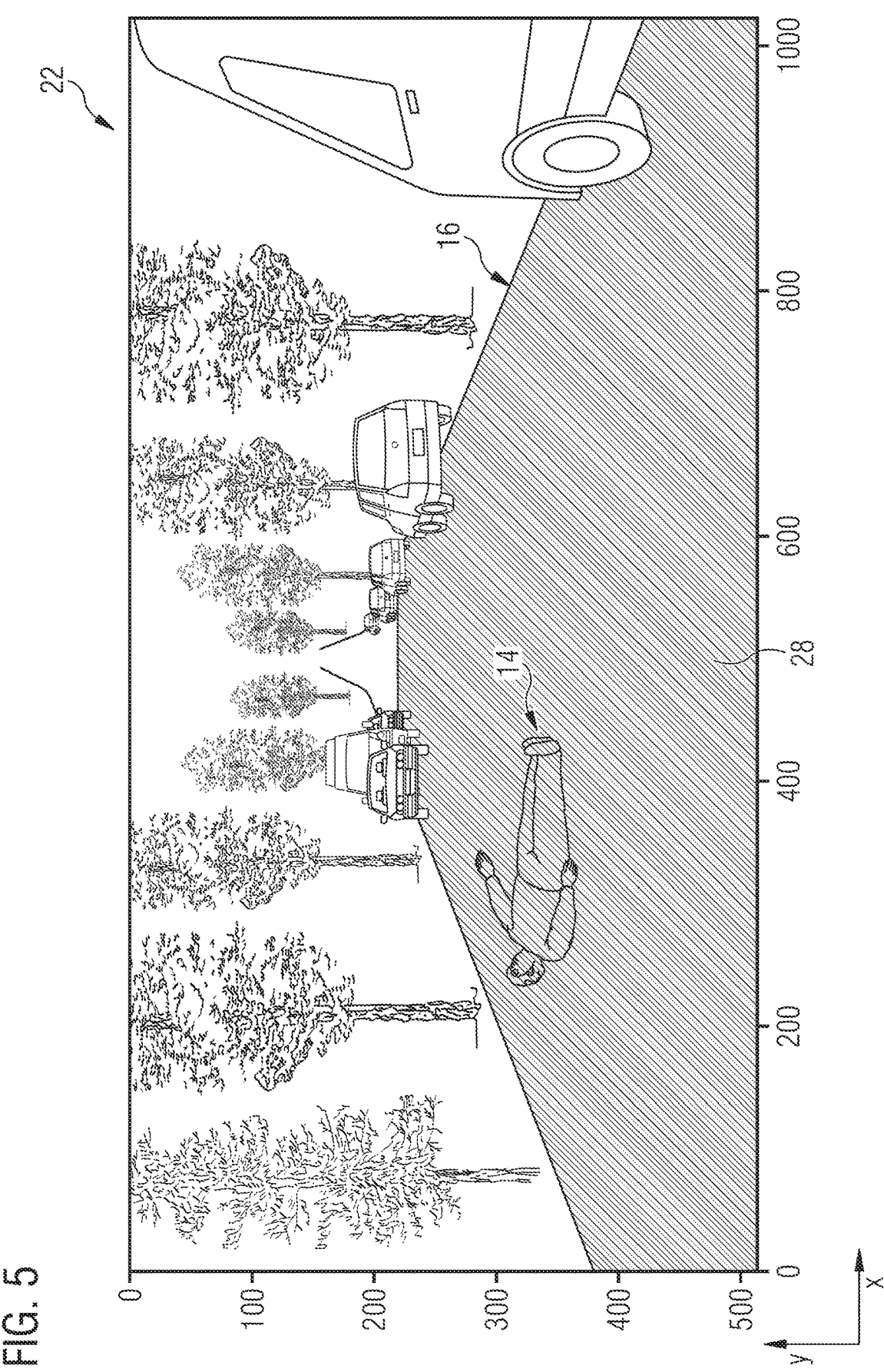
FIG. 5 shows a schematic representation of an image of a detection area, in which the first area is highlighted.
Figure 6:
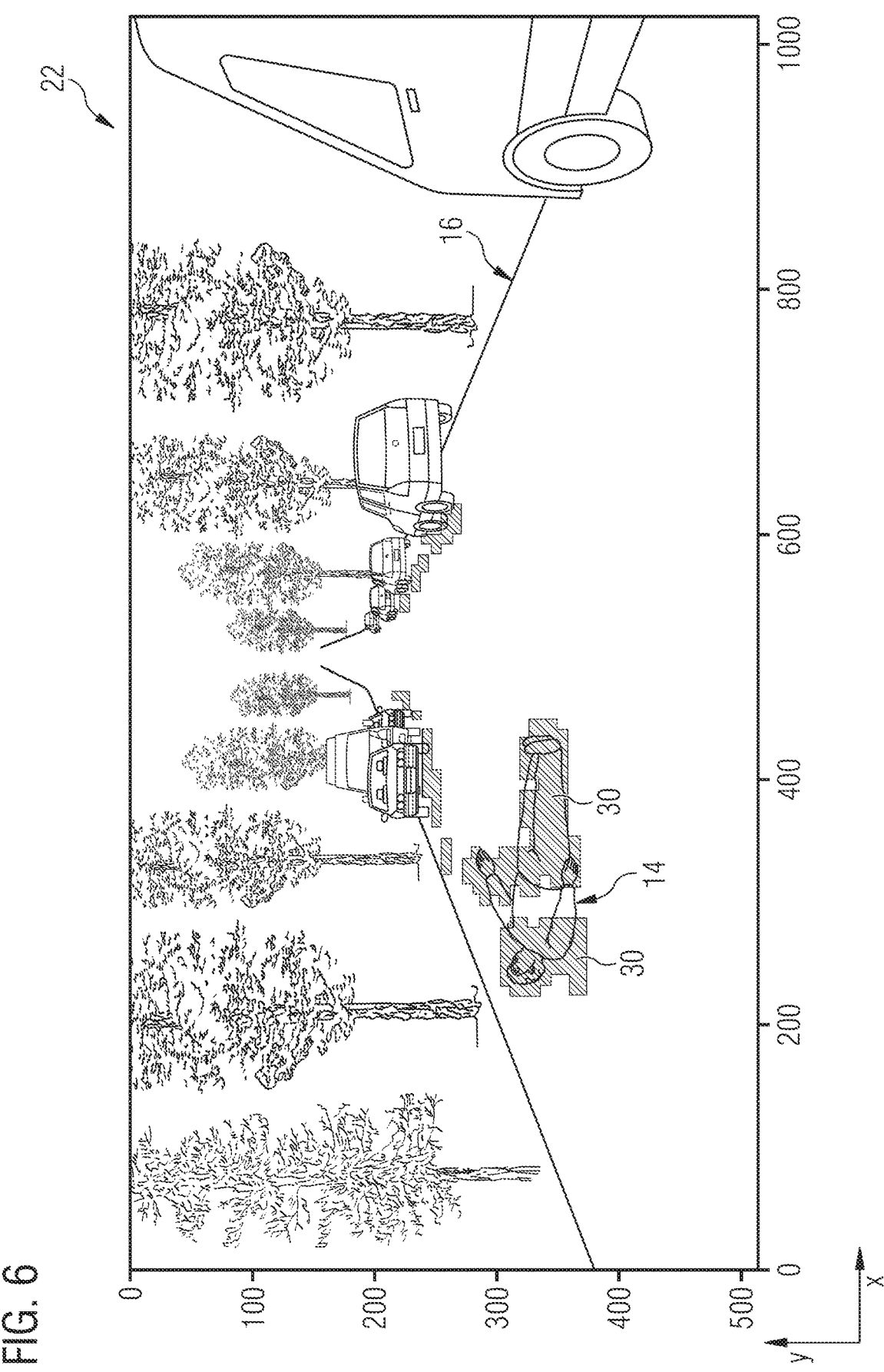
FIG. 6 shows a further schematic representation of the image of the detection area in which the second area is highlighted.

In step S10, the sequence is started. Then, in step S12, an image of the detection area 22 is captured by means of the camera 18. Then, in step S14, image data associated with the image is generated. Subsequently, in step S16, a first image area 28 of the image is determined by means of the image data using the neural network 32. For this purpose, all layers of the neural network 32 are used. The first image area 28 corresponds to the roadway 16 in the detection area 22 and is shown in FIG. 5. Step S16 is explained in more detail below in connection with FIG. 3. In step S18, a second image area 30 of the image is determined using image data corresponding to the first image area 28 using the neural network 32. For this purpose, an output information of an intermediate layer of the neural network 32, in some embodiments, of the encoder network 34 of the neural network 32, is used. The second image area 30 corresponds to the source of danger 14 on the roadway 16 in the detection area 22 and is shown in FIG. 6. Further details of step S18 are described in connection with FIG. 4 below. Subsequently, the sequence is terminated in step S20.

Figure 3:
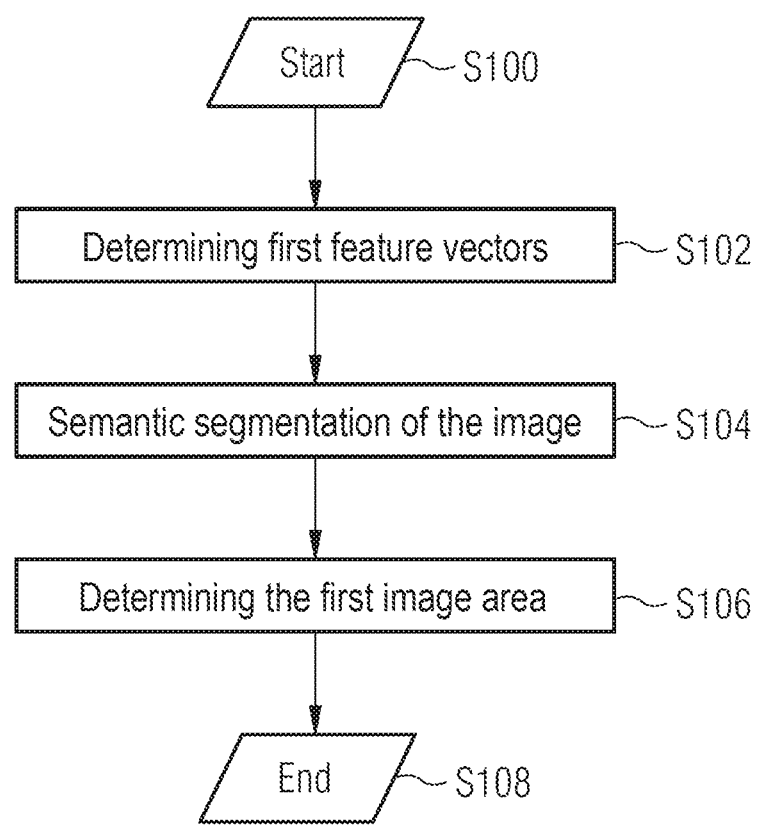
FIG. 3 shows a flowchart of a detailed procedure for determining a first area on the roadway.

FIG. 3 shows a flowchart of a detailed sequence for determining a first area on the roadway 16 using the neural network 32 in step S16 according to FIG. 2.

In step S100, the sequence is started. Subsequently, in step S102, the image data generated in step S14 is processed using the neural network 32 to determine first feature vectors. For this purpose, all layers of the neural network 32 are used. The first feature vectors are arranged in a matrix and are a particularly suitable representation of the information contained in the image of the detection area 22 for further processing. In step S104, a semantic segmentation of the image is performed by means of the first feature vectors. In this process, content-related image areas of the image are determined. Subsequently, in step S106, the first image area 28, which corresponds to the roadway 16 in the detection area 22, is determined on the basis of the semantic segmentation of the image performed in step 104. Finally, the sequence is terminated in step S108.

Figure 4:
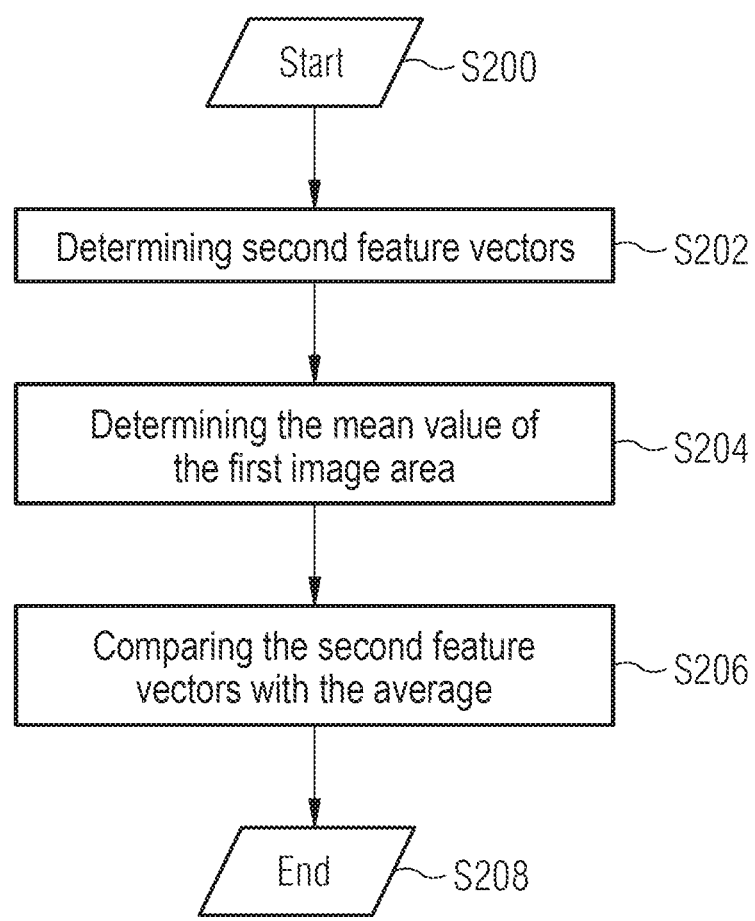
FIG. 4 shows a flowchart of a detailed procedure for determining a second area on the roadway.

FIG. 4 shows a flowchart with a detailed sequence of the step S18 according to FIG. 2.

In step S200, the sequence is started. Subsequently, in step S202, a second feature vector is determined for each of predetermined subareas of the first image area 28 using output information of an intermediate layer of the neural network 32. This intermediate layer of the neural network 32 belongs to the encoder network 34 of the neural network 32. The encoder network 34 consequently determines, by means of the image data, a representation in the form of a matrix of the second feature vectors of the first image area 28 which is particularly suitable for further processing. Generally, this representation will have a lower resolution than the image itself, i.e., there will not be exactly one second feature vector for each pixel of the first image area 28. In particular, the size of the predetermined subareas depends on the ratio of the resolution of the image to the resolution of the representation, i.e., the matrix of second feature vectors. For example, a respective predetermined subarea may correspond to a respective second feature vector of the representation, the subarea being in turn associated with a plurality of pixels arranged, for example, in a rectangular subarea of the image.

In step S204, the mean value of all first feature vectors assigned to the pixels of the first image area is formed. Subsequently, in step S206, the difference between the mean value and the second feature vectors is determined for each of the second feature vectors. If the value of this difference is above, below or at a predetermined threshold, the predetermined subarea associated with the respective second feature vector is assigned to the second image area. After the difference between the mean value and the second feature vectors has been determined for all second feature vectors, the second image area 30 has thus been determined. Subsequently, the sequence is terminated in step S208.

FIG. 5 shows a schematic representation of the image of the detection area 22. In the representation according to FIG. 5, the first area 28 of the roadway 16 is highlighted. FIG. 5 further shows a first coordinate axis X and a second coordinate axis Y of the pixels of the image. In the exemplary representation according to FIG. 5, it extends to the value 200 of the second coordinate axis Y. Trees are arranged on the sides of the roadway 16. Furthermore, further vehicles are arranged laterally and partially on the roadway 16. If the vehicles are arranged on the roadway 16 or partially on the roadway 16, the areas of the roadway 16 on which the vehicles obscure the roadway 16 in the image are excluded from the first area 28. On the roadway 16 is the source of danger 14, which is shown in FIGS. 5 and 6 as an example of an injured person.

FIG. 6 shows another schematic representation of the image of the detection area 22. The representation according to FIG. 6 is substantially the same as the representation according to FIG. 5, but in FIG. 6 the second area 30 of the roadway 16 is highlighted.

FIG. 7 shows a schematic representation of the neural network 32 used in steps S102 according to FIGS. 3 and S202 according to FIG. 4 for determining the first image area 28 and the second image area 30. The neural network 32 comprises the encoder network 34 and the decoder network 36, which in turn comprise multiple layers.

The encoder network 34 consists of several convolutional layers 36 and pooling layers 40, of which only one layer at a time is shown in FIG. 7 for the sake of clarity. The presence of convolutional layers makes the neural network 32 a so-called convolutional neural network. The encoder network 34 has the image data as input and uses this image data to determine a representation of the image in the form of a matrix of feature vectors.

The decoder network 36 also consists of several layers, which are not shown individually in FIG. 7 for clarity. The output of the network 32 is a representation of the image data in the form of a matrix of feature vectors, which allows semantic segmentation of this image data. In particular, this representation allows the first subarea 28 to be determined.

LIST OF REFERENCE SIGNS 10 vehicle
12 device
14 source of danger
16 roadway
18 camera
20 coordinate cross
22 detection area
24 image processing and evaluation unit
26 cable 28, 30 image area
32 neural network
34 encoder network
36 decoder network
38 convolutional layer
40 pooling layer The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to [insert list], are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for determining a source of danger on a roadway in a detection area in front of or behind a vehicle, with the aid of a camera of the vehicle, in which with the aid of the camera an image of the detection area is captured, the method comprising:
generating image data corresponding to the image;
determining a first image area of the image with the aid of the image data using a neural network, the first image area corresponding to substantially only the roadway in the detection area specifically designed for vehicle traffic; and
determining a second image area of the image with the aid of the first image area using the neural network or a further neural network, the second image area corresponding to the source of danger on the roadway in the detection area.

2. The method of claim 1, further comprising, with the aid of the first image area, using an output information of an intermediate layer of the neural network, determining the second image area, the neural network comprising at least an encoder network and a decoder network.

3. The method of claim 1, further comprising:
with the aid of the image data, using the neural network, for each pixel of the image, determining one first feature vector; and
with the aid of these first feature vectors, determining the first image area.

4. The method of claim 1, further comprising:
determining second features vectors using the neural network for the first image area;
determining a mean value of the second feature vectors assigned to the pixels of the first image area; and
using this mean value and the second feature vectors, determining the second image area.

5. The method of claim 1, further comprising:
with the aid of the image data using the neural network, for each pixel of the image, determining one first feature vector;
with the aid of these first feature vectors, determining the first image;
with the aid of the neural network, determining second feature vectors for the first image area;
assigning a mean value of the second feature vectors to the pixels of the first image area;
for each of the second feature vectors, determining the difference between the mean value of all second feature vectors forming the first image area and the respective second feature vector; and
when the value of this difference is above, below, or on a predetermined threshold value, assigning a predetermined subarea of the image assigned to the respective second feature vector to the second image area.

6. The method of claim 1, further comprising, with the aid of the first image area, using an output information of an encoder network of the neural network, determining the second image area.

7. The method of claim 1, further comprising, with the aid of the image data using the neural network pixels of the image assigned to the first area are determined.

8. The method of claim 1, wherein the neural network is a convolutional neural network.

9. The method of claim 1, further comprising training the neural network with the aid of images of real traffic situations that have been captured with the aid of the camera of the vehicle or a camera of a further vehicle.

10. The method of claim 1, further comprising, with the aid of the image data, determining an enveloping body surrounding the source of danger.

11. The method of claim 1, further comprising classifying the source of danger with the aid of image data using an image recognition method performed in a further neural network.

12. A device for determining a source of danger on a roadway in a detection area in front of or behind a vehicle, the device comprising:
a camera configured to capture an image of the detection area; and
an image processing and evaluation unit configured to generate image data corresponding to the image to:
determine a first image area of the image with the aid of the image data using a neural network, the first image area corresponding to substantially only the roadway in the detection area specifically designed for vehicle traffic; and
determine a second image area of the image with the aid of the first image area using the neural network or a further neural network, the second image area corresponding to the source of danger on the roadway in the detection area.

13. A computer-readable medium, wherein the computer-readable medium does not constitute a transitory data signal, having contents configured to cause a computing system to determine a source of danger on a roadway in a detection area in front of or behind a vehicle, with the aid of a camera of the vehicle, in which with the aid of the camera an image of the detection area is captured, wherein, to determine the source of danger, the computing system is caused to:
generate image data corresponding to the image;
determine a first image area of the image with the aid of the image data using a neural network, the first image area corresponding to substantially only the roadway in the detection area specifically designed for vehicle traffic; and
determine a second image area of the image with the aid of the first image area using the neural network or a further neural network, the second image area corresponding to the source of danger on the roadway in the detection area.

14. The computer-readable medium of claim 13, wherein the computing system is further caused to, with the aid of the first image area, use an output information of an intermediate layer of the neural network to determine the second image area, the neural network comprising at least an encoder network and a decoder network.

15. The computer-readable medium of claim 13, wherein the computing system is further caused to:
   with the aid of the image data, using the neural network, for each pixel of the image, to determine one first feature vector; and
   with the aid of these first feature vectors, determine the first image area.

16. The computer-readable medium of claim 13, wherein the computing system is further caused to:
   determine second features vectors using the neural network for the first image area;
   determine a mean value of the second feature vectors assigned to the pixels of the first image area; and
   use this mean value and the second feature vectors, determining the second image area.

17. The computer-readable medium of claim 13, wherein the computing system is further caused to:
   with the aid of the image data using the neural network, for each pixel of the image, determine one first feature vector;
   with the aid of these first feature vectors, determine the first image;
   with the aid of the neural network, determine second feature vectors for the first image area;
   assign a mean value of the second feature vectors to the pixels of the first image area;
   for each of the second feature vectors, determine the difference between the mean value of all second feature vectors forming the first image area and the respective second feature vector; and
   when the value of this difference is above, below, or on a predetermined threshold value, assign a predetermined subarea of the image assigned to the respective second feature vector to the second image area.

18. The computer-readable medium of claim 13, wherein the computing system is further caused to, with the aid of the first image area, use an output information of an encoder network of the neural network to determine the second image area.

19. The computer-readable medium of claim 13, wherein the computing system is further caused to, with the aid of the image data, use the neural network to determine pixels of the image assigned to the first area.

20. The computer-readable medium of claim 13, wherein the computing system is further caused to classify the source of danger with the aid of image data using an image recognition method performed in a further neural network.

* * * * *